3,293,196
FORMABLE STYRENE POLYMER COMPOSITION AND METHOD OF PRODUCING FOAMED STYRENE POLYMER
Kiyoshi Nakamori, Ikeda-shi, Osaka-fu, Japan, assignor to Sekisui Sponge Kogyo Kabushiki Kaisha, Osaka, Japan, a corporation of Japan
No Drawing. Filed Feb. 26, 1963, Ser. No. 261,219
Claims priority, application Japan, Apr. 16, 1962, 37/15,525; Apr. 25, 1962, 37/16,920; May 24, 1962, 37/21,391
8 Claims. (Cl. 260—2.5)

This invention is concerned with a method of producing foamed styrene polymer. It is further concerned with styrene polymer compositions to be used in said method. More particularly, this invention relates to the method for continuous and efficient production of foamed styrene polymer sheet or film by extrusion on conventional extruding machines. It relates further to extrudable and foamable styrene polymer compositions to be used in said method.

In regard to the production of foamed styrene polymer sheet or film by extrusion on extruding machines, the methods described in U.S. Patents Nos. 2,941,964 and 2,941,965 have already been known. The methods described therein consist in extruding a mixture composed of polystyrene particles having integrated therewith a normally liquid aliphatic hydrocarbon having a boiling point in the range of 30°–90° C., a carbon dioxide liberating agent such as carbonates or bicarbonates of alkali metal or alkaline earth metal, and boric acid or organic acids on conventional extruding machines.

In those methods, an aliphatic hydrocarbon of which boiling point is in the range of 30°–90° C. is employed as foaming agent and polystyrene is foamed under the coaction of said foaming agent and carbon dioxide liberating agent with acid. However, my research revealed that the above-mentioned methods still have many defects and are by no means most desirable. That is, the carbon dioxide liberating agent being readily reactive with boric acid or an organic acid, a premature reaction between the two takes place in the vicinity of the hopper of the extruder when extruding the afore-described admixture on a conventional extruding machine, and the resultant carbon dioxide does not remain in polystyrene extruded from the die, but escapes from the hopper. This results in the extruded product only insufficiently foamed and therefore, the product is of no commercial value. It is possible prior to the operation to cause the polystyrene particles to have integrated therein the carbon dioxide liberating agent and/or the boric or organic acid to prevent said premature reaction of the carbon dioxide liberating agent with the boric or organic acid. But this requires additional blending and kneading process and incurs extra costs.

Accordingly, one object of this invention consists in providing novel foamable styrene polymer compositions capable of being made into foamed styrene polymer having substantially uniform, fine voids by extrusion on a conventional extruding machine.

Another object of this invention consists in providing novel methods of producing foamed styrene polymer having substantially uniform, fine voids.

Other objects and advantages of this invention will be clarified by detailed explanations given hereunder.

The afore-mentioned objects of this invention is attained by blending homogeneously (A) styrene polymer particles having integrated therein a material chosen from the group consisting of aliphatic hydrocarbons of which boiling temperatures are below the softening point of the styrene polymer and haloaliphatic hydrocarbons of which boiling temperatures are below the softening point of the styrene polymer, (B) an acid chosen from the group consisting of boric acid and organic acids, (C) a carbon dioxide liberating agent, and (D) a material for preventing the contact of said acid with carbon dioxide liberating agent, and extruding said admixture at a temperature above the softening point of said styrene polymer on a conventional extruding machine.

The term "styrene polymer" used in this invention embraces styrene homopolymers, viz., polystyrene as well as copolymers of styrene with other monomers. Suitable copolymers are, for example, copolymer of styrene with divinyl benzene and copolymer of styrene with methylmethacrylate.

In this invention, the afore-mentioned material chosen from the group consisting of aliphatic and haloaliphatic hydrocarbons of which boiling temperatures are below the softening point of the styrene polymer is employed as a foaming agent. Said foaming agent normally is either gaseous or liquid, viz., under atmospheric pressure at 20° C. Examples of suitable normally gaseous foaming agents are propane, propylene, butane and methyl chloride. And, suitable normally liquid foaming agents are, for example, pentane, hexane, and petroleum ether. When a normally liquid foaming agent is used in this invention, there is a danger that the foaming agent, having been vaporized and performed the foaming of styrene polymer during the later described extrusion stage, may regain its liquid state as the extruded product is cooled, and consequently the pressure inside the foams of the product turns of negative gauge pressure which may cause the product to contract. Thus the product may come to have defective dimensional stability.

On the contrary, when a normally gaseous foaming agent is used, there is obtained a product being free from said defect and having markedly ameliorated dimensional stability. Further, normally gaseous foaming agents are capable of performing greater degree of foaming of styrene polymer compared with normally liquid ones, decreasing the consumption of the carbon dioxide liberating agent and the acid and thus enabling to reduce the quantity of contaminants present in the product. So, generally speaking, normally gaseous foaming agents are preferable to normally liquid ones. Especially, propane is the best suited foaming agent because of its low boiling point and ready availability.

As to the method for incorporating the foaming agent into styrene polymer, any known means may be applicable. For example, the sytrene polymer particles dispersed in the aqueous medium may be penetrated with the foaming agent or styrene may be polymerized in the presence of a normally liquid or normally gaseous foaming agent to produce a styrene polymer having integrated therein the foaming agent, the resultant polymer then being finely divided into particles. The most advantageous method is, as described in the Japanese Official Patent Gazette under Publication No. 10,628/61, that which comprises feeding propane gas under pressure into styrene polymer particles in such a state that styrene polymer particles and a small amount of solvent of said polymer, for example, tetrachloroethylene, are dispersed in the aqueous medium. By this method, propane gas penetrates easily and uniformly into styrene polymer particles and is retained therein for a long time by the aid of the solvent.

In this invention, the shape of styrene polymer particles having integrated therein a foaming agent may be pellet, grain, flake, etc.

In this invention, ammonium, alkali and alkaline earth metal carbonates and bicarbonates may be used as the carbon dioxide liberating agent. In general, soft products of finer voids are obtained when alkali carbonates are employed. For example, comparing the cases of using sodium carbonate and sodium bicarbonate, the product is softer and the voids thereof, finer with sodium carbonate than with sodium bicarbonate.

In this invention, an acid chosen from the group consisting of boric and organic acids is employed. Examples of suitable organic acids are oxalic, malonic, maleic, fumaric, succinic, itaconic, citraconic, adipic, citric, stearic, oleic, tartaric, phthalic, benzoic, benzene sulfonic, toluene sulfonic, and diglycolic acid. Moreover, acid salts such as potassium bitartrate may be used in place of the above acids.

In general, the higher the melting point and pyrolytic temperature of said organic acid, the greater the foamability of the product and the finer the resultant foams. When the cases with tartaric, maleic and citric acids are compared, the voids are the finest with tartaric acid, and become larger in order of with maleic acid and citric acid. Again solid acids are preferred to liquid ones because of easier handling.

In order to prevent the immediate reaction between the carbon dioxide liberating agent and acid when they are fed to the hopper of the extruder, either or both of these are coated with a suitable material and thereby kept apart each other.

As such coating materials, oily materials or powdery solid matters which do not substantially react with the styrene polymer particles having integrated therein the afore-mentioned foaming agent, acid and carbon dioxide liberating agent may be used.

Representative oily materials are, for example, such mineral oils as liquid paraffin, synthetic liquid surface activating agents, silicon oils, liquid phthalate esters such as dibutyl phthalate and dioctyl phthalate and various vegetable oils. If liquid paraffin is used especially among those oily materials, this liquid paraffin acting also as a lubricant, will make the later described extruding operation easier, without any substantial degrading of the product. This is the reason why liquid paraffin is the most preferred of all the oily materials described in this invention.

In this invention, powdery solid matters can be also used to prevent contact between the carbon dioxide liberating agent and the acid. These powdery solid matters must be such that, when mixed with the acid and the carbon dioxide liberating agent, can cover uniformly the surface of the acid or that of the carbon dioxide liberating agent. Suitable example of such is finely divided starch.

The carbon dioxide liberating agent and the acid kept apart each other by means of said oily material or the pulverized solid matter do not easily react at room temperature. But when they are well blended and kneaded with each other in the extruder and heated up to the temperature at which styrene polymer becomes extrudable, they readily react and generate carbon dioxide and water.

The amounts of the foaming agent, carbon dioxide liberating agent and acid to be used in this invention should be determined in conformity with the apparent specific gravity of the aimed foamed styrene polymer.

Generally speaking, comparing this invention with those described in U.S. Patents Nos. 2,941,964 and 2,941,965, the weight ratios of the foaming agent, acid and carbon dioxide liberating agent to styrene polymer required for the production of foamed styrene polymer of a given apparent specific gravity from the same material are markedly smaller in this invention than those in the prior art because in the former the acid and the carbon dioxide liberating agent are adequately kept apart each other so that the loss resulting from their premature reaction is effectively prevented. Particularly when a normally gaseous foaming agent is used in this invention, its weight ratio to styrene polymer can be still less than the case of a normally liquid foaming agent.

Thus it is desirable that the foaming agent be used at the ratio of 3–4 weight percent of styrene polymer in case of a normally gaseous one and 4.5–9 weight percent in case of a normally liquid one. It is also desirable that the acid be used at the ratio of 0.5–2.0 milligram equivalent per 100 g. of styrene polymers and that the carbon dioxide liberating agent, at the ratio slightly in excess of equivalent weight of said acid.

According to this invention, the styrene polymer having integrated therein the afore-mentioned foaming agent, acid, carbon dioxide liberating agent, and materials for preventing the contact of said acid with said carbon dioxide liberating agent are uniformly admixed and then extruded into the form of sheet or film on an extruding machine.

For this purpose, conventional extruding machines and dies for extruding thermoplastic polymers can be used. For example, for preparing thin, foamed sheet, an inflation extruder or an extruder equipped with a flat die publicly known hitherto may be used without conversion. It is naturally understood that the extruders and dies can be appropriately modified or provided with additional equipments depending upon the type of foamed styrene polymer to be produced thereon. Its extruding operations are similar to conventional extrusion of thermoplastic polymers and comprise heating the mixture above the softening point of the styrene polymer, blending and kneading the same and extruding continuously through the die slit the foamed styrene polymer. The operational conditions such as extruding temperature should be appropriately determined according to the types of styrene polymer and aimed products.

Thus, when the sytrene polymer, acid, carbon dioxide liberating agent and material for preventing the contact of the acid with the carbon dioxide liberating agent are uniformly mixed and the resulting admixture is fed to the hopper of a conventional extruding machine, the acid and the carbon dioxide liberating agent do not immediately react because they are separated each other by an oily or powdery material and the temperature is not yet high enough. Afterwards, the acid and the carbon dioxide liberating agent present in the admixture react when said admixture is blended, kneaded and heated sufficiently as it advances toward the die. The carbon dioxide resulting from the afore-described reaction does not flee away from the hopper, but mostly contained in the styrene polymer extruded. Thus there is obtained foamed styrene polymer having numerous uniform fine voids.

Further, when a normally gaseous material is used as foaming agent in this invention, extruded objects of excellent dimensional stability are obtained because they are not subject to contraction upon cooling to the room temperature.

The examples of this invention are given hereunder. Unless otherwise indicated, parts and percentages therein refer to those by weight.

*Example 1*

Foamable polystyrene beads having incorporated therein 6 percent propane gas and 1.5 percent tetrachloroethylene were prepared by the method described in the Japanese Official Patent Gazette under Publication No. 10,628/61. Separately, 0.1 part of critic acid and 0.4 part of liquid paraffin were well mixed, the resulting mixture then being mixed with 0.2 part of sodium bicarbonate powder, 50 parts of general purpose polystyrene beads and 50 parts of foamable polystyrene beads above mentioned to make a foamable composition. Said composition was well mixed and fed to the hopper of a conventional thermoplastic resin extruder and extruded at a temperature of 130° C. in accordance with the accepted practice into the form of cylindrical sheet. There was obtained a foamed polystyrene sheet having uniform fine voids and superficial lustre and having an apparent density of approx. 0.1 g. per cubic centimeter.

*Example II*

Foamable polystyrene beads having incorporated therein 3 percent of propane gas and 1 percent of tetrachloroethylene were prepared in the same way as in the foregoing example. Then, well mixed 0.1 part of citric acid and 0.1 part of liquid paraffin were uniformly blended with 0.2 part of sodium bicarbonate and 100 parts of foamable polystyrene beads mentioned above. The resulting composition was extruded in the same way as in the example 1. There was obtained a foamed polystyrene sheet having the properties substantially similar to those obtained in the foregoing example.

*Example III*

First, foamable polystyrene beads having incorporated therein 6 percent of propane gas and 1.5 percent of tetrachloroethylene were manufactured in the same way as in the foregoing examples. Next, well mixed 0.2 part of sodium bicarbonate and 0.3 part of silicon oil were uniformly blended with 0.15 part of citric acid, 50 parts of general purpose polystyrene beads and 50 parts of foamable polystyrene beads mentioned above. The resulting composition was extruded in the same way as in the foregoing examples. There was obtained a foamed polystyrene sheet having the properties substantially similar to those obtained in the foregoing examples.

*Example IV*

First, foamable polystyrene beads having incorporated therein 3 percent of propane gas and 1 percent of tetrachloroethylene were prepared in the same way as in the foregoing examples. Next, well mixed 0.2 part of sodium bicarbonate and 0.2 part of dibutyl phthalate were thoroughly blended with 0.15 part of citric acid and 100 parts of foamable polystyrene beads mentioned above. The resulting composition was extruded in the same way as in the foregoing examples. There was obtained a foamed polystyrene sheet having the properties substantially similar to those obtained in the foregoing examples.

*Example V*

Foamable polystyrene beads having incorporated therein 3 percent of propane gas and 1 percent of tetrachloroethylene were manufactured in the same way as in the foregoing examples. Next, by treating 0.1 part of citric acid with 0.1 part of an oily surface activating agent commercially available under the trade name of "Silvan T-20" (anionic surface activating agent composed mainly of polyoxyethylenesorbitanmonoester of fatty acid, sold by Matsumoto Yusi-seiyaku Kabushiki Kaisha), the surface activating agent was adhered to the surface of said critic acid. Thus coated citric acid was then uniformly blended with 0.2 part of sodium bicarbonate and 100 parts of foamable polystyrene beads mentioned above, and the mixture was extruded in the same way as in the foregoing examples. There was obtained foamed polystyrene sheet having the properties substantially similar to those obtained in the foregoing examples.

*Example VI*

0.2 part of sodium bicarbonate was well mixed with 0.2 part of liquid paraffin. The obtained mixture was further blended thoroughly with 0.1 part of critic acid and 100 parts of foamable polystyrene beads prepared in advance and having incorporated therein 6 weight percent of petroleum ether. The resulting composition was extruded in the same way as in the foregoing examples. There was obtained a foamed polystyrene sheet having the properties substantially similar to those obtained in the foregoing examples.

*Example VII*

0.2 part of sodium bicarbonate and 0.2 part of silicon oil were well mixed. The obtained mixture was further blended thoroughly with 0.1 part of citric acid and 100 parts of foamable polystyrene beads prepared in advance and having incorporated therein 6 weight percent of petroleum ether. The resulting composition was extruded in the same way as in the foregoing examples. There was obtained a foamed polystyrene sheet having the properties substantially similar to those obtained in the foregoing examples.

*Example VIII*

First, foamable polystyrene beads having incorporated therein 6 weight percent of propane gas and 1.5% of tetrachloroethylene were manufactured in the same way as in Example 1. Next, 0.2 part of sodium bicarbonate and 0.06 part of starch were well mixed. Thus obtained mixture was further blended thoroughly with 0.1 part of citric acid, 35 parts of polystyrene beads for general purpose, and 65 parts of foamable polystyrene beads mentioned above. The resulting composition was extruded in the same way as in the previous example. There was obtained a foamed polystyrene sheet having the properties substantially similar to those obtained in the foregoing examples.

*Example IX*

By treating 0.1 part of tartaric acid with 0.15 part of liquid paraffin, the liquid paraffin was adhered to the surface of said tartaric acid. The obtained material was blended thoroughly with 0.1 part of sodium carbonate and 100 parts of foamable polystyrene beads same to that used in the foregoing example. The resulting composition was extruded in the same way as in the foregoing examples. There was obtained a foamed polystyrene sheet having the properties substantially similar to those obtained in the foregoing examples.

What is claimed is:

1. A composition capable of being foamed and extruded, comprising (a) styrene polymer particles having integrated therewith propane, (b) at least one acid which has been coated with a liquid paraffin selected from the group consisting of boric acid, malonic acid, maleic acid, fumaric acid, succinic acid, itaconic acid, citraconic acid, oleic acid, tartaric acid, phthalic acid, benzoic acid, benzene sulfonic acid, toluene sulfonic acid, diglycolic acid and potassium bitartrate, and (c) at least one carbon dioxide liberating agent selected from the group consisting of carbonates and bicarbonates of alkalies and alkaline earth metals, the said components having been mixed homogeneously.

2. The composition of claim 1 wherein the styrene polymer is polystyrene.

3. The composition of claim 1 wherein the acid component is citric acid.

4. The composition of claim 1 wherein the acid component is tartaric acid.

5. A method of preparing a foamed styrene polymer which comprises the steps of homogeneously mixing (a) styrene polymer particles having integrated therewith propane, (b) at least one acid coated with a liquid paraffin which has been selected from the group consisting of boric acid, malonic acid, maleic acid, fumaric acid, succinic acid, itaconic acid, citraconic acid, oleic acid, tartaric acid, phthalic acid, benzoic acid, benzene sulfonic acid, toluene sulfonic acid, diglycolic acid and potassium bitartrate, and (c) at least one carbon dioxide liberating agent selected from the group consisting of carbonates and bicarbonates of alkalies and alkaline earth metals, and extruding the resulting mixture at a temperature above the softening point of the said styrene polymer.

6. The method of claim 5 wherein the styrene polymer is polystyrene.

7. The method of claim 5 wherein the acid component is citric acid.

8. The method of claim 5 wherein the acid component is tartaric acid.

References Cited by the Examiner
UNITED STATES PATENTS

| | | | |
|---|---|---|---|
| 2,941,964 | 6/1960 | Houston et al. | 260—2.5 |
| 3,063,965 | 11/1962 | Colclough | 260—47 |
| 3,089,857 | 5/1963 | Pottenger | 260—2.5 |
| 3,138,563 | 6/1964 | Morgan et al. | 260—2.5 |

MURRAY TILLMAN, *Primary Examiner.*

SAMUEL H. BLECH, *Examiner.*

M. FOELAK, *Assistant Examiner.*